Patented Jan. 11, 1938

2,105,389

UNITED STATES PATENT OFFICE 2,105,389

NITRATION OF ORGANIC CARBOHYDRATES

Joseph A. Wyler, Allentown, Pa., assignor to Trojan Powder Company, a corporation of New York No Drawing. Application October 12, 1935, Serial No. 44,687

6 Claims. (Cl. 260—145)

My invention relates to improvements in the nitration of organic carbohydrates, and more particularly relates to improvements in the simultaneous nitration or co-nitration of a plurality of carbohydrate bodies. My invention relates specifically to the co-nitration or simultaneous nitration of sugar and of carbohydrates such as starch. One of the objects of my invention is to provide means for the preparation of explosive bodies having improved characteristics and capable of being used to advantage as explosives and in the formulation of explosive mixtures, to give properties in the finished explosive which are not obtainable from the simple nitrated carbohydrates or even from a mixture of these nitrated carbohydrates. This application is a continuation in part of my pending application S. N. 727,592, filed May 25, 1934.

The nitration of various sugars such as cane sugar, glucose, levulose, etc. and of mixtures of sugars with glycerine, glycol and certain of their derivatives is well known and is described in the general literature as well as disclosed in domestic and foreign patents.

The chief reasons for the use of sugar nitrates have been cheapness of product and lowering of freezing point of nitroglycerine and, so far as applicant knows, only nitrated cane sugar has actually been utilized in commercial explosives, and when thus used it has been invariably in the form of a viscous liquid in solution in nitrated glycerine. The patent literature also discloses that 20–25% solutions of nitrated sugar in nitrated glycerine are preferred for reasons of low viscosity and practicability of stabilization. If stronger solutions of nitrated cane sugar in nitrated glycerine are made, it will be found very difficult to stabilize the mixtures due to the viscosity of these higher sugar nitrate content solutions.

If such sugars as cane sugar or glucose are nitrated alone, the product is always a gummy, taffy-like substance which cannot be stabilized at ordinary temperatures except through costly and tedious re-solutions and re-precipitations combined with alkaline treatments, resulting in very poor yields.

It is also known that if these gummy nitrated sugars are cooled to about 0° C. or lower, they become brittle and can be pulverized under ice water and when in this finely divided condition, can be treated with ice cold alkaline solutions and thus stabilized.

Applicant has discovered that under certain conditions nitrated starch is very soluble in nitrated sugars and that the melting point of these nitrated sugars is raised very considerably by the dissolved nitrated starch. Applicant has also discovered that if a sugar such as cane sugar, glucose or cerelose is mixed with 10% or more of its weight of powdered corn starch or cassava starch for example and this mixture is nitrated by the action of nitric acid, preferably in admixture with a dehydrating agent such as sulfuric or phosphoric acids in the same manner that starch is nitrated, a plastic mass results in the nitrator, which mass can readily be separated from the spent acid and transferred to a kneading trough supplied with a steadily flowing stream of tap water, and here readily caused to lose its doughiness and to revert to a fine powder which can be handled as a powder at ordinary temperatures or higher. Thus I am able to stabilize the nitrated sugar mixture very readily at ordinary temperatures and also to dry same at a temperature of approximately 40° C.

As descriptive of a method that I may use in the nitration of a starch-sugar mixture, I give the following example:

100 lbs. of finely ground cane sugar is thoroughly mixed with 25 lbs. of dried corn starch and the mixture fed to 360 lbs. of 95% $HNO_3$, keeping the nitration mixture at a low temperature, say, below 20° C. At the end of this operation all of the starch and all of the sugar will have gone into solution. Next, 510 lbs. of oleum of about 105% $H_2SO_4$ strength is added slowly with continued cooling and stirring. When all of this oleum has been added, the nitrated sugar will have separated as a doughy plastic mass. This is separated from the acid and transferred to a kneading tank supplied with a current of tap water, where, in a short time the doughy mass is converted to a fine, pulverulent precipitate which is filtered, washed with tap water and transferred to a stirring tank containing dilute alkali solution in which it is stirred for one hour or more to stabilize the nitrated product, which consists of a mutual solid solution of nitrated sugar and nitrated starch. The alkaline mixture is then filtered, washed with tap water and dried at about 40° C.

This dried co-nitrated product is a slightly yellow, dusty, low density powder, readily detonatable and soluble in the usual solvents used for gelatin explosives and for lacquers. When made in the manner just described the product will contain about 14.50% N present as nitrate, and its packing density will be about one-third that of ordinary nitrostarch.

Although I prefer the above described procedure for co-nitration. I do not confine myself to these narrow limits. It will readily be understood that one may vary the strengths of the acids used or their proportions or the proportions of sugar to starch, or the proportions of carbohydrate to acid, etc. and not depart from the spirit of this invention. Temperatures up to 30° C. may be used, for example, although I find that temperatures not in excess of 20° C. are preferable. Instead of washing with water, I may employ any aqueous solution of a neutral salt, or even a very dilute alkaline solution.

As an example of how I may nitrate with a mixed acid direct, instead of starting out with strong $HNO_3$ and then adding the oleum later, I submit the following:

100 lbs. of finely ground cane sugar is thoroughly mixed with 25 lbs. of dried starch and the mixture added to 1080 lbs. of a mixed acid consisting of:

| | Per cent |
|---|---|
| $H_2SO_4$ | 64 |
| $HNO_3$ | 34 |
| $H_2O$ | 2 |

The temperature of the nitration is preferably kept below 20° C. and the gummy nitration layer is removed and handled in the same manner as described in the example mentioned above, resulting in a fine, dry powder.

The product that I obtain by the practice of my present invention is quite different from any of the products which have been obtained by earlier workers in this field. The products obtained by the practice of my invention are pulverulent masses of a very light, fluffy nature, and appear to consist of what is known as a "solid solution" of nitrated starch and nitrated sugar, the two component materials not being present individually, but being combined or mutually dissolved. The nitrated product, unless compressed, is of very low apparent density, and is normally of a finely divided or pulverulent nature, even when not subjected to any comminuting operation.

I am aware that earlier workers have nitrated colloided cellulose or "parchmentized" cellulose with sugar to obtain grains or masses of pulp, but my invention is quite distinct from this, as I do not employ cellulose in the practice of my invention, and I do not parchmentize or otherwise colloid the starch which I use, and the product which I obtain is not a granular nor a coherent mass, but is a very light, fluffy pulverulent product consisting of nitrated starch and nitrated sugar in combination and apparently in mutually dissolved condition, in a form sometimes known as a solid solution.

By the practice of my present invention I obtain an explosive product in a very advantageous physical condition for use in the preparation of explosives mixtures. The finely divided condition, and the very low apparent density of my product, make it a particularly valuable component for use in explosive compositions where a low density or a "high stick count" is desired. Although I have described the use of sugars with starch in the preferred practice of my invention, I have discovered that the glycosides are the full equivalent of sugar in the practice of my invention, and when the glycosides of sugars are used in the practice of my invention they give products very similar in all respects to those obtained from the use of the particular sugar of which the glycoside is the derivative.

My invention relates to both the composition of matter and the process of making same as herein described. It will be evident that many modifications may be made within the limits of the disclosure as herein made, and accordingly no limitations should be placed upon my invention, except as indicated in the appended claims.

I claim:

1. As a new composition of matter a light, fluffy, pulverulent nitrated material consisting of a solid solution of nitrostarch in a predominating amount of nitrated sucrose, and containing not less than 8.4% of nitrostarch.

2. As a new composition of matter a light, fluffy, pulverulent nitrated material consisting of a predominating amount of nitrated sucrose and of nitrostarch, said material containing not less than 8.4%, by weight, of nitrated starch, and being substantially free from individual particles of either pure nitrostarch or pure nitrated sucrose.

3. As a new composition of matter a stable, light, fluffy pulverulent nitrated material consisting chemically of a predominating amount of nitrated sucrose and of nitrated starch, and containing not less than 8.4% of nitrated starch, but being substantially free from individual particles of either pure nitrostarch or pure nitrated sucrose.

4. The process which comprises forming a plastic mixture consisting of nitrated starch and a predominating amount of nitrated sucrose, such mixture containing not less than 8.4% of nitrostarch, in the presence of a fluid comprising nitric acid, at a temperature within the range of −10° C. and 30° C., and thereafter transforming this plastic mass into a light, fluffy, pulverulent product by contact with water.

5. The process which comprises forming a plastic mixture consisting of nitrated starch and a predominating amount of nitrated sucrose, such mixture containing not less than 8.4% of nitrostarch, in the presence of nitrating acid at a temperature within the range of −10° C. and 30° C., and thereafter transforming this plastic mass into a light, fluffy, pulverulent product by contact with a solution comprising water.

6. The process which comprises forming a plastic mixture consisting of nitrated starch and a predominating amount of nitrated sucrose, such mixture containing not less than 8.4% of nitrostarch, in the presence of nitrating acid at a temperature within the range of −10° C. and 30° C., and thereafter transforming this plastic mass into a light, fluffy, pulverulent product by contact with a dilute alkali solution.

JOSEPH A. WYLER.